US006975998B1

(12) United States Patent
Jones

(10) Patent No.: US 6,975,998 B1
(45) Date of Patent: Dec. 13, 2005

(54) PACKAGE DELIVERY NOTIFICATION SYSTEM AND METHOD

(75) Inventor: Martin Kelly Jones, Vancouver (CA)

(73) Assignee: ArrivalStar, Inc., Delray Beach, FL (US)

( * ) Notice: Subject to any disclaimer, the term of this patent is extended or adjusted under 35 U.S.C. 154(b) by 551 days.

(21) Appl. No.: 09/516,288

(22) Filed: Mar. 1, 2000

(51) Int. Cl.[7] .............................................. G06F 17/60

(52) U.S. Cl. ..................... 705/8; 705/9; 705/10; 705/1; 705/7; 198/370; 198/434; 198/435; 198/444; 198/445; 206/497; 235/385; 455/466; 700/213; 700/214; 700/215; 700/216; 700/217; 700/219; 701/209

(58) Field of Search .................. 705/1, 7–10; 198/370, 198/434, 435, 444, 445; 206/497; 235/385; 700/213–219; 701/209

(56) References Cited

U.S. PATENT DOCUMENTS

| | | | | |
|---|---|---|---|---|
| 3,644,883 A | | 2/1972 | Borman et al. | 340/23 |
| 3,845,289 A | | 10/1974 | French | 235/151.2 |
| 3,934,125 A | | 1/1976 | Macano | 235/150.2 |
| 4,220,946 A | | 9/1980 | Henriot | 340/23 |
| 4,297,672 A | * | 10/1981 | Fruchey et al. | 340/994 |
| 4,325,057 A | | 4/1982 | Bishop | 340/539 |
| 4,350,969 A | | 9/1982 | Greer | 340/23 |
| 4,713,661 A | | 12/1987 | Boone et al. | 340/994 |
| 4,791,571 A | | 12/1988 | Takahashi et al. | 364/436 |
| 4,799,162 A | | 1/1989 | Shinkawa et al. | 364/436 |
| 4,804,937 A | | 2/1989 | Barbiaux et al. | 340/52 F |
| 4,812,843 A | | 3/1989 | Champion, III et al. | 340/905 |
| 4,894,649 A | | 1/1990 | Davis | 340/825.44 |
| 4,956,777 A | | 9/1990 | Cearley et al. | 364/424.02 |
| 5,014,206 A | | 5/1991 | Scribner et al. | 364/449 |
| 5,021,780 A | | 6/1991 | Fabiano et al. | 340/994 |
| 5,068,656 A | | 11/1991 | Sutherland | 340/989 |
| 5,097,429 A | | 3/1992 | Wood et al. | 364/569 |
| 5,113,185 A | | 5/1992 | Ichikawa | 340/995 |
| 5,121,326 A | | 6/1992 | Moroto et al. | 364/449 |
| 5,122,959 A | * | 6/1992 | Nathanson et al. | 701/117 |
| 5,144,301 A | | 9/1992 | Jackson et al. | 340/994 |
| 5,153,842 A | * | 10/1992 | Dlugos et al. | 700/227 |
| 5,168,451 A | | 12/1992 | Bolger | 364/436 |
| 5,218,629 A | | 6/1993 | Dumond, Jr. et al. | 379/59 |

(Continued)

FOREIGN PATENT DOCUMENTS

| | | | |
|---|---|---|---|
| EP | 0219859 A2 | 4/1987 | G08G 1/12 |

(Continued)

OTHER PUBLICATIONS

Hitchcock, Nancy. "The Big Hiccup".Apr. 1996; Apparel Industry Magazine; v57n4 pp16-28. Retrieved Jun. 10, 2002 DIALOG.*

(Continued)

*Primary Examiner*—James P. Trammell
*Assistant Examiner*—James A. Reagan
(74) *Attorney, Agent, or Firm*—Thomas, Kayden, Horstemeyer & Risley, LLP

(57) ABSTRACT

A package delivery notification system reports impending package deliveries and precisely notifies recipients of when to expect the deliveries. The package delivery notification system utilizes memory, a communications device, and a system manager. Package data identifying a package that is to be delivered to a recipient is stored in the memory. The package data indicates that the recipient is to receive the package and indicates the expected time that the package is to be delivered. When the package is assigned to a vehicle that will deliver the package to a premises of the recipient, the system manager transmits, via the communications device, a notification message to the recipient. The notification message preferably indicates the approximate time that the package is expected to arrive.

13 Claims, 3 Drawing Sheets

U.S. PATENT DOCUMENTS

| | | | | |
|---|---|---|---|---|
| 5,223,844 | A | 6/1993 | Mansell et al. | 342/357 |
| 5,271,484 | A | 12/1993 | Bahjat et al. | 187/29.1 |
| 5,299,132 | A | 3/1994 | Wortham | 364/460 |
| 5,351,194 | A | 9/1994 | Ross et al. | 364/449 |
| 5,381,338 | A | 1/1995 | Wysocki et al. | 364/449 |
| 5,394,332 | A | 2/1995 | Kuwahara et al. | 364/449 |
| 5,400,020 | A | 3/1995 | Jones | 340/994 |
| 5,420,794 | A | 5/1995 | James | 364/436 |
| 5,428,546 | A | 6/1995 | Shah et al. | 364/449 |
| 5,432,841 | A | 7/1995 | Rimer | 379/59 |
| 5,444,444 | A | 8/1995 | Ross | 340/994 |
| 5,446,678 | A | 8/1995 | Saltzstein et al. | 364/514 |
| 5,448,479 | A | 9/1995 | Kemner et al. | 365/424.02 |
| 5,461,374 | A | 10/1995 | Lewiner et al. | 340/994 |
| 5,483,454 | A | 1/1996 | Lewiner et al. | 364/443 |
| 5,493,295 | A | 2/1996 | Lewiner et al. | 340/994 |
| 5,513,111 | A | 4/1996 | Wortham | 364/460 |
| 5,519,621 | A | 5/1996 | Wortham | 364/460 |
| 5,539,810 | A | 7/1996 | Kennedy, III et al. | 379/59 |
| 5,544,225 | A | 8/1996 | Kennedy, III et al. | 379/59 |
| 5,546,444 | A | 8/1996 | Roach, Jr. et al. | 379/59 |
| 5,570,100 | A | 10/1996 | Grube et al. | 364/446 |
| 5,587,715 | A | 12/1996 | Lewis | 342/357 |
| 5,594,650 | A | 1/1997 | Shah et al. | 364/449.1 |
| 5,602,739 | A | 2/1997 | Haagenstad et al. | 364/436 |
| 5,623,260 | A | 4/1997 | Jones | 340/994 |
| 5,648,770 | A | 7/1997 | Ross | 340/994 |
| 5,652,707 | A | 7/1997 | Wortham | 364/460 |
| 5,657,010 | A | 8/1997 | Jones | 340/994 |
| 5,668,543 | A | 9/1997 | Jones | 340/994 |
| 5,673,305 | A | 9/1997 | Ross | 379/58 |
| 5,680,119 | A | 10/1997 | Magliari et al. | 340/904 |
| 5,719,771 | A | 2/1998 | Buck et al. | 364/443 |
| 5,724,243 | A | 3/1998 | Westerlage et al. | 364/446 |
| 5,734,981 | A | 3/1998 | Kennedy, III et al. | 455/445 |
| 5,736,940 | A | 4/1998 | Burgener | 340/994 |
| 5,739,774 | A | 4/1998 | Olandesi | 340/994 |
| 5,751,245 | A | 5/1998 | Janky et al. | 342/357 |
| 5,760,742 | A | 6/1998 | Branch et al. | 342/457 |
| 5,774,825 | A | 6/1998 | Reynolds | 364/449.7 |
| 5,808,565 | A | 9/1998 | Matta et al. | 340/994 |
| RE35,920 | E | 10/1998 | Sorden et al. | 342/457 |
| 5,922,040 | A | 7/1999 | Prabhakaran | 701/117 |
| 5,955,974 | A | 9/1999 | Togawa | 340/994 |
| 6,006,159 | A * | 12/1999 | Schmier et al. | 701/200 |
| 6,094,149 | A | 7/2000 | Wilson | 340/904 |
| 6,097,317 | A | 8/2000 | Lewiner et al. | 340/994 |
| 6,124,810 | A | 9/2000 | Segal et al. | 340/994 |
| 6,134,501 | A | 10/2000 | Oumi | 701/209 |
| 6,137,425 | A | 10/2000 | Oster et al. | 340/994 |
| 6,184,802 | B1 | 2/2001 | Lamb | 340/994 |
| 6,191,708 | B1 | 2/2001 | Davidson | 240/994 |
| 6,222,462 | B1 | 4/2001 | Hahn | 340/904 |
| 6,240,362 | B1 | 5/2001 | Gaspard, II | 701/209 |
| 6,253,146 | B1 | 6/2001 | Hanson et al. | 701/202 |
| 6,253,148 | B1 | 6/2001 | Decaux et al. | 701/204 |
| 6,360,101 | B1 | 3/2002 | Irvin | 455/456 |
| 6,374,176 | B1 | 4/2002 | Schmier et al. | 701/200 |
| 6,400,956 | B1 | 6/2002 | Richton | 455/456 |
| 6,618,668 | B1 | 9/2003 | Laird | 701/200 |
| 2002/0016171 | A1 | 2/2002 | Doganata et al. | 455/456 |
| 2002/0069017 | A1 | 6/2002 | Schmier et al. | 701/213 |
| 2002/0098802 | A1 | 7/2002 | Jones | 340/994 |
| 2002/0099500 | A1 | 7/2002 | Schmier et al. | 701/200 |

FOREIGN PATENT DOCUMENTS

| | | | | |
|---|---|---|---|---|
| EP | 0805427 A1 | | 11/1997 | G08G 1/123 |
| FR | 2 559 930 | | 8/1985 | G08G 1/12 |
| FR | 2674355 | | 9/1992 | G08G 1/123 |
| JP | 52066175 | | 6/1977 | |
| JP | 63288400 | | 11/1988 | G08G 1/12 |
| JP | 11034872 A | | 2/1999 | B61L 25/02 |
| NL | 9000609 A | * | 3/1990 | B60J 5/08 |
| WO | WO 90/01236 | | 2/1990 | H04M 1/54 |
| WO | WO 93/13503 | | 7/1993 | |
| WO | WO 9313510 A1 | | 7/1993 | G08G 1/123 |
| WO | WO 94/02922 | | 2/1994 | G08G 1/123 |
| WO | WO 94/27264 | | 11/1994 | G08G 1/123 |
| WO | WO 96/04634 | | 2/1996 | G08G 5/22 |
| WO | WO 96/16386 | | 5/1996 | G08G 1/123 |
| WO | WO 98/07128 | | 2/1998 | G08G 1/123 |
| WO | WO 98/08206 | | 2/1998 | |
| WO | WO 98/14926 | | 4/1998 | G08G 1/123 |
| WO | WO 98/40837 | | 9/1998 | G06G 7/70 |

OTHER PUBLICATIONS

Bar Code (anonymous). Jun. 1999; Automatic ID News; v15n7. Retrieved Jun. 10, 2002 [DIALOG].*

Moriok, et al., "Advanced Vehicle Monitoring and communication Systems for Bus Transit—Benefits and Economic Feasibility", Final Report—U.S. Department of Transportation, Sep. 1991, Revised Mar. 1993, Dot-T-94-03.

Brynielsson, Thore, Step by Step Development Towards Attractive Public Transport, Chalmers University of Technology, Gotebord, Sweden, Department of Transportation, 1976.

"Public Transporation Information and Management Ssytems", IEE Colloquium, Computing and Control Division, May 25, 1993, pp. 9/1-9/4, 12/1-12/2, 7/1-7/3.

"Vehicle Location and Fleet Management Systems", IEE Colloquium, Computing and Control Division, Jun. 8, 1993.

The 3rd International Conference on Vehicle Navigation & Information Systems (VNIS) Norway, Sep. 2-4, 1992, pp. 312-315.

Preiss, George; Jenson, Lillian; "The Satref and GPS Information Projects", 1992 IEEE—3rd International Conference on Vehcile Navigation Information Systems, ppp. 648-655.

"Vehicle Navigation & Information Systems Conference Proceedings" (P-253), Society of Automotive Engineers, Inc., Oct. 1991, pp. 789-796.

"1992 Compendium of Technical Papers", Institute of Transportation Engineers—INRAD: A Deminostration of Two-Way Roadway to Vehicle Communication for use in Traffic Operations, Annual Meeting, Washington, D.C. pp. 214-218.

"Paving the Way for GPS in Vehicle Tracking", Showcase World, Dec. 1992.

"Advanced Vehicle Monitoring and Communication Systems for Bus Transit", Federal Transit Administration, Sep. 1991, Revised Mar. 1993.

Koncz, et al., "GIS-Based Transit Information Bolsters Travel Options", GIS World, Jul. 1995, pp. 62-64.

Helleker, Jan, Real-Time Traveller Information—in everyone's pocket?!—a pilot test using hand-portable GSM terminals, IEEE—IEE Vehicle Navigation & Information systems Conference, Ottawa, VNIS 1993, pp. 49-52.

Burgener, E.C., et al., "A Personal Transit Arrival Time Receiver", IEEE—IEE Vehicle Navigation & Information Systems Conference, Ottawa, VNIS 1993, pp. 54-55.

Peng, Zhong-Ren, "A Methodology for Design for a GIS-Based Automatic Transit Traveler Information System", Computer, Environment and Urban Systems, vol. 21, No. 5, pp. 359-372, 1997.

Lessard, Robert, "The Use of Computer for Urban Transit Operations", IEEE—IEE Vehicle Navigation & Information systems Conference, Ottawa, VNIS 1993, pp. 586-590.

Sommerville, Fraser, et al., "Reliable Information in Everyone's Pocket—a Pilot Test", IEEE, vol. 1927, Mar. 1994, pp. 425-428.
"PROMISE—Personal Mobile Traveller and Traffic Information Service—Specification of Promise Services, Ver. 7", Telematics Application Programme A2, Transport, Jul. 1, 1996.
"PROMISE—Personal Mobile Traveller and Traffic Information Service—Generic Promise System Architecture, Ver. 2", Telematics Application Programme A2, Transport, Sep. 10, 1996.
PROMISE—Personal Mobile Traveller and Traffic Information Service—Summary of Promise Public Relation Activities, Ver. 1, Telematics Application Programme A2, Transport, Feb. 12, 1999.
"PROMISE"—A Personal Mobile Traveller and Traffic Information Service—Abstract, The Institution of Electrical Engineers, 1997.
Sommerville, Fraser, et al., "The Promise of Increased Patronage", The Institution of Electrical Engineers, 1993, pp. 3/1-3/4.
"Automatic Transit Location System", Washington State Department of Transportation, Final Report, Feb. 1996.
"Advanced Traveler Aid Systems for Public Transportation", Federal Transit Administration, Sep. 1994.
"Advanced Vehicle Monitoring and Communication Systems for Bus Transit: Benefits and Economic Feasibility", U.S. Department of Transportation, Urban Mass Transportation Administration, Sep. 1991.
Leong, Robert, et al., "An Unconventional Approach to Automatic Vehicle Location and Control for Urban Transit", IEEE 1989, pp. 219-223.
"1994 Vehicle Navigation & Information Systems Conference Proceedings", Yokahama, Japan, Aug. 31-Sep. 2, 1994, pp. 807-810.
"Vehicle Navigation & Information Systems Conference Proceedings—P-253, Part 2", Society of Automotive Engineers, Inc., Oct. 1991.
Vehicle Navigation & Information Systems—Conference Record of Papers presented at the 3rd Vehicle Navigation & Information Systems Conference 1992., Reso Hotel, Osio Plaza., pp. 49-52.
Nelson, J. Richard, "Experiences Gained in Implementing an Economical Universal Motorist System",, IEEE—IEE Vehicle Navigation & Information Systems Conference, Ottawa, VNIS 1993, pp. 67-71.
"The Cassiope/Eurobus Approach", IEEE—IEE Vehicle Navigation & Information Systems Conference, Ottawa, VNIS 1993, pp. 79-81.
Kihl, Mary, "Advanced Vehicle Location System for Paratransit in Iowa", IEEE—IEE Vehicle Navigation & Information Systems Conference, Ottawa, VNIS 1993, pp. 381-384.
Gault, Helen, et al., "Automatic Vehicle Location and Control at OC Transpo",, IEEE—IEE Vehicle Navigation & Information Systems Conference, Ottawa, VNIS 1993, pp. 596-600.
Vehicle navigation & Information System—Conference Record of Papers presented at the First Vehicle Navigation and Information Systems Conference (VNIS '89), Sep. 11-13, 1999, pp. 602-605.
Heti, Gabriel, "Travelguide: Ontario's Route Guidance System Demonstration",, IEEE—IEE Vehicle Navigation & Information Systems Conference, Ottawa, VNIS 1993, pp. A13-A18.
Jeffery, D.J., et al., "Advanced Traveller Information Systems in the UK: Experience from the Pleiades and Romanse Projects",, IEEE—IEE Vehicle Navigation & Information Systems Conference, Ottawa, VNIS 1993, pp. 309-313.
Sweeney, Lawrence, E., et al., "Travinfo: A Progress Report", 1994 Vehicle Navigation & Information Systems Conference Proceedings, Yokahama, Japan, Aug. 31-Sep. 2, 1994, pp. 315-320.
Shimamura, Yta, et al., "Combined Position Detection System for Pedestrian/Train Mode", 1994 Vehicle Navigation & Information Systems Conference Proceedings, Yokahama, Japan, Aug. 31-Sep. 2, 1994, pp. 603-606.
Zavoli, Walt, "Customer Location Services", 1994 Vehicle Navigation & Information Systems Conference Proceedings, Yokahama, Japan, Aug. 31-Sep. 2, 1994, pp. 613-617.
Tanaka, Yoshimi, et al., "Automatic Traffic Information Provision System Utilizing Facsimile and Telephone (Now Operating in Osaka), 1994 Vehicle Navigation & Information Systems Conference Proceedings", Yokahama, Japan, Aug. 31-Sep. 2, 1994, pp. 627-632.
McDonald, Mike, et al., "Romanse (Road Management System for Europe) Project", 1994 Vehicle Navigation & Information Systems Conference Proceedings, Yokahama, Japan, Aug. 31-Sep. 2, 1994, pp. A-11-A-14.
Scott III, Robert H., "Computer-Aided Dispatch,", 1998, pp. 46-50.
Moore, Rodney J., "Hold the Phone!", American Demographics, Ithaca, Jan./Feb. 1996, p. 68.
Delong, Jr., Edgar S., "Making 911 even better", Telephony, Dec. 14, 1987, pp. 60-63.
Bruzek, Frank J., "Class Calling Service—A Consumer Service Perspective", Globecom '85 IEEE Global Telecommunications Conference, Dec. 2-5, 1985, vol. 1 of 3, pp. 11.4.1-11.4.4.
Powell, R., et al., "Real Time Passenger Information System for the Romanse Project", Colloouin Digest—IEE, Boston, Sep. 1993, pp. 9/1-9/3.
Huber, Paul, "Public Transport Information Systems in Munich", Intelligent Transport Systems World Congress '95—Second Wold Congress on Intelligent Transport Systems, Yokohama, Japan., Nov. 9-11, 1995, pp. 2362-2366.
Ronez, Nicholas, et al, "GIS-Based Transit Information Bolsters Travel Options", GIS World, vol. 6, part 7, Jun. 1995, pp. 62-64.
Catling, Ian, et al., "TABASCO—Improving Transport Systems in Europe", Pacific Rim TransTech Conference, Jul. 30-Aug. 2, 1995, 995 Vehicle Navigation & Information Systems Conference Proceedings, Washington State Convention and Trade Center, Seattle, Washington, USA, pp. 503-507.
Dailey, D.J., "Demonstration of an Advance Public Transportation System in the Context of an IVHS Regional Architecture", Proceedings of the First World Congress on Applications of Transport Telematics and Intelligent Vehicle-Highway Systems, Nov. 30-Dec. 3, 1994, Paris, France, pp. 3024-3031.
Hubner, Paul, "Advance Public Transportation Information in Munich", International Conference on Public Transport Electronic Systems, Conference Publication No. 42, Jun. 1996.

Thompson, S.M., et al., "Exploiting Telecommunications to Delivery Real Time Transport Information", Road Transport Information and Control, Apr. 21-23, 1998, pp. 59-63, Conference Publication No. 454 IEE 1998.
Kaminitzer, David, et al., Driver Information Systems: Influencing your Route, IEE Seminar, Mar. 3, 1999, pp. 5/1-5/5.
"Board Cites ATC in Spokane Near Miss", Article in Aviation Week & Space Technology, Mar. 28, 1977, URL: http://www.aviationnow.com.
Shifrin, Carole A., "Gate Assignment Expert System Reduces Delays at United's Hubs", Article in Aviation Week & Space Technology, Jan. 25, 1988.
"United Airlines applies TI's advance technologies to improve gate management at major airports", Article in Business Wire, Inc., Nov. 19, 1987.
Musich, Paula, "Airline Designs Software to move planes, people; Unite Airline's use of Covia Corp.'s Open Systems Manager, Connectivity Section", Article in PC Week, Jun. 7, 1988, vol. 5, No. 23, p. C11.
Stoll, Marilyn, "Systems help Airlines Manage Gate Schedules; Connectivity Supplement", PC Week, Jul. 25, 1988, vol. 5, No. 30, p. C4.
Reddy, Shyamala, "Traveling LAN: United Airlines Networks Its Terminals", Article in The Local Area Network Magazine, Jan. 1990, vol. 5, No. 1, p. 108.
Fisher, Sharon, "Networked Airport Systems help Travelers find their way; United Airlines subsidiary Covia Corp. devices integrated network.", Article in Software Magazine, Mar. 15, 1990, vol. 10, No. 4, Pg. 31.
Henderson, Danna K., "Automation Takes aim at airports: the power of the networked PC is being unleashed on passenger handling and ramp activities worldwide.", Article in Air Transport Wold, Aug. 1990., vol., 27, No. 8, p. 52.
"United Airlines introduces United Cargo Plug I, a new cargo computer system to serve freight forwarders", Business Wire, Oct. 22, 1990.
Miller, Barry, "Special Report: Airline Equipment, Service Center", Aviation Week & Space Technology, Aug. 25, 1975, p. 51.
Lyon, Mark W., "Cargo Net Debate Splits Industry", Journal of Commerce, Specials, Pg. 4, Jul. 27, 1992.
Davies, I.L., et al., "Electronics and the Aeroplane", Proceedings of the Institution of Electrical Engineers, Paper No. 7604, delivered before the IEE Electronics Division, Oct. 29, 1975.
"Global Niche", Flight International, Sep. 26, 1990.
"Real-Time Briefings", Aviation Week and Space Technology, Oct. 13, 1986.
Flanagan, Mike, et al., "Amelia Earhart—Mystery Still Clouds Soaring Achievements", Chicago Tribune, Jul. 5, 1987, Final Edition, Pg. 5, Tempo Woman.
"Official Airline Guides", Airports®, Nov. 20, 1990, Around Airports, vol. 7, No. 47, p. 485.
"Automation System Gains Acceptance", Aviation Week & Space Technology, Nov. 23, 1992, vol. 137, No. 21, p. 97.
Klass, Philip, "French Testing Ground-Derived MLS", Aviation & Space Technology, Avionics, Pg. 56, Dec. 15, 1975.
"Forecast Realized for ATC System", Aviation & Space Technology, Mar. 17, 1975, Avionics, Pg. 168.
Henderson, Danna, et al., "Ionworks: America West Automates New Phoenix Terminal Fully Integrated System to Handle Customer-Service Demands (America West Airlines Inc) (Includes Related Article Automation of passenger Service at Airports)", Airport Transport World, May 1, 1991. vol. 62.
3 Pages from a web site search under http://mit.edu/afs/net.mit/edu/project/attic/usa-today/tech/37, Jun. 12, 2003.
"What's New in passenger Handling Equipment", Air Transport World, vol. 24, Pg. 62, Sep. 1987.
"Senator Urges Acceleration of Navstar", Aviation & Space Technology, Avionics, p. 153, Oct. 3, 1983.
"AFSC Broadens Joint Program Efforts", Aviation & Space Technology, System Acquisition, p. 83, Jul. 19, 1976.
Herskovitz, Don, "GPS Insurance Antijamming the System; Brief Article", Journal of Electronic Defense, Dec. 1, 2000, No. 12, vol. 23, Pg. 41.
Hambly, Richard M., et al., "Aircraft Traffic Management on the Airport Surface Using VHF Data Link for CNS", IEEE AES Systems Magazine, Mar. 1995, pp. 9-13.
Berzins, G., et al., "INMARSAT: Worldwide Mobile Satellite Services on Seas, in Air and on Land", Space Technology, vol. 10, No. 4, pp. 231-237, 1990.
Jenney, L.L., et al., "Man as Manager of Automated Resources in an Advanced Air Traffic System", J. Aircraft, vol. 12, No. 12, Dec. 1975.
"Routing & Scheduling System improvements from RTSI; Routing Technology Software, Inc.; Product Announcement", Modern Brewery Age, vol. 43, No. 3, Pg. 11S, Jan. 20, 1992.
Yanacek, Frank, "Hitching to the stars; satellites for shipment tracking", Research Information Transportation Journals, Combined, No. 6, vol. 29, p. 16.
Stoll, Marilyn, "For on-the-road firms, hand-held terminals are pivotal. Connectivity", Research Information Transportation Journals, Combined, No. 34, vol. 5, p. C11.
"IBM and Hunt to Market New Truck Tracker; International Business Machines", J.B. Hunt Transport Services; Brief Article, No. 210, vol. 101, P. 4.
Klass, Philip J., "Two Carriers Plan Automatic Data Link", Aviation Week and Space Technology, Air Transport Section, May 23, 1977, p. 36.
"Data Link Evolved Over Three Decades", Aviation Week and Space Technology, Air Transport Section, May 23, 1977, p. 36.
Klass, Philip J., "American to Install Printers in Cockpits", Aviation Week and Space Technology, Avionics, Jul. 21, 1980, p. 56.
Lefer, Henry, "Computers on a boon to E&M, but at a price", Air Transport World, vol. 23, Pg. 53, Feb., 1986.
Donaghue, J.A., "Choice of Data Link Systems Expands as New Generation Hits the Market", Air Transport World, vol. 20, p. 58, Apr. 1983.
Klass, Philip J., "Digital Network Could Improve Aircraft Links to Operations, ATC", Aviation Week and Space Technology, International Air Transport Section, vol. 131, No. 21, P. 121, Nov. 20, 1989.
Board Cites ATC in Spokane Near Miss, Article in Aviation Week & Space Technology, Safety Section, Mar. 28, 1977, p. 59.
"Vicorp Interactive Systems", Aviation Daily, Aviation Suppliers Section, vol. 309, No. 17, p. 147.
Neumann, Dr. Horst, "ATC Concepts with Extensive Utilization of Automatic Data Processing", pp. 4-1 to 4-9; No Publication Information or Date Information Provided.

Maxwell, Robert L., "Automation Possibilities in Air Traffic Control", pp. 561-563, No Publication Information or Date Information Available.
"History of GPS", 3 pages, No Publication Information or Date Information Available.
"Road Transport Research—Intelligent Vehicle High Systems—Review of Field Trials", prepared by An OECD Scientific Expert Group, pp. 1-101, Organisation for Economic Co-Operation and Development—No Date Information Available.
Ratcliff, Robert, et al., Transportation Resources Information Processing System (TRIPS), pp. 109-113, No Publication Information or Date Information Available.
Balke, Kevin,, et al., Collection and Dissemination of Real-Time Travel Time and Incident Information with In-Vehicle Communication Technologies, pp. 77-82, No Publication Information or Date Information Available.

* cited by examiner

PACKAGE DELIVERY NOTIFICATION SYSTEM AND METHOD

BACKGROUND OF THE INVENTION

1. Field of the Invention

The present invention generally relates to delivery information systems and, in particular, to a package delivery notification system and method for reporting when a vehicle is expected to deliver a package.

2. Related Art

In providing package delivery services, a recipient of a package is not always aware when a package is being sent to the recipient. In this regard, a sender does not always inform the recipient when sending a package to the recipient via a package delivery service. Furthermore, the operator of the package delivery service usually does not provide the recipient with advanced notice of the package. Therefore, the recipient is often not aware that a package has been sent to the recipient until the package is actually delivered to the recipient.

In some situations, the sender may notify the recipient that the sender is sending a package to the recipient. However, the sender may not know or may not provide to the recipient an approximate date on which the package should arrive. Therefore, the recipient is aware that a package has been sent but is not aware of when the package should arrive.

In other situations, the sender may send a package to a recipient via a package delivery service that guarantees that the package will arrive at the premises of the recipient on a particular date. Sometimes the delivery service guarantees that the package will arrive at the recipient's premises before a particular time (e.g., before noon), as well. This information may be communicated to the recipient by the sender so that the recipient is aware of when (i.e., the date and sometimes the approximate time period) to expect the package.

However, the recipient is not usually aware of the precise time that the package will be delivered. For example, when a package is guaranteed to be delivered before noon on a particular day, the package may arrive at any time before noon (e.g., between approximately 8:30 a.m. and 12:00 p.m.), depending on the route and number of stops made by the delivery vehicle in delivering the package and other packages. Adding to the difficulty of estimating when a package may arrive, the route and number of stops made by the same delivery vehicle often changes from day-to-day, depending on the destinations of each of the packages delivered by the delivery vehicle.

In addition, in some cases, the delivery service may fail to meet its guarantee and may deliver the package after the specified time period. The delivery service often does not contact the recipient when the package does not arrive on time, and the recipient, therefore, is usually not aware of the failure in delivery until the specified time period has expired.

Furthermore, it is also possible for the delivery service to deliver the package before its guaranteed delivery time and/or date. For example, a package sent via a two day delivery service may actually arrive at the package's destination a day early. In such a situation, the recipient may not be available to receive the package, since the recipient may not be expecting the package until the next day. As a result, the recipient does not receive the package at the earliest possible time, and/or the package may be left unattended at the recipient's premises until discovered by the recipient.

Thus, a heretofore unaddressed need exists in the industry for providing a delivery system and method of reporting package deliveries and of more precisely notifying a recipient of when to expect delivery of a package.

SUMMARY OF THE INVENTION

The present invention overcomes the inadequacies and deficiencies of the prior art as discussed hereinbefore. Generally, the present invention provides a package delivery notification system and method for reporting impending package deliveries and for precisely notifying a recipient of when to expect delivery of a package.

In architecture, the package delivery notification system of the present invention utilizes memory, a communications device, and a system manager. Package data identifying a package that is to be delivered to a recipient is stored in the memory. The package data indicates that the recipient is to receive the package and indicates the expected time that the package is to be delivered. When the package is assigned to a vehicle that will deliver the package to a premises of the recipient, the system manager transmits, via the communications device, a notification message to the recipient. The notification message preferably indicates the approximate time that the package is expected to arrive.

In accordance with another feature of the present invention, the package data indicates the order in which deliver vehicle is to deliver a plurality of packages assigned to it. The system manager can precisely determine the time period that each package is to be delivered based on the order of delivery. Therefore, the time period indicated by the notification message is more precise and accurate.

The present invention can also be viewed as providing a method for reporting vehicle deliveries. The method can be broadly conceptualized by the following steps: receiving a plurality of packages; assigning each of the packages to a vehicle; determining an order that the vehicle is to deliver the packages; determining, based on the order, a first time period that the vehicle is expected to deliver one of the packages to a recipient; causing a notification message to be transmitted to the recipient based on the determining a first time period step; indicating the first time period via the notification message; simultaneously transporting each of the packages via the vehicle; and transporting the one package to a premises of the recipient via the vehicle.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
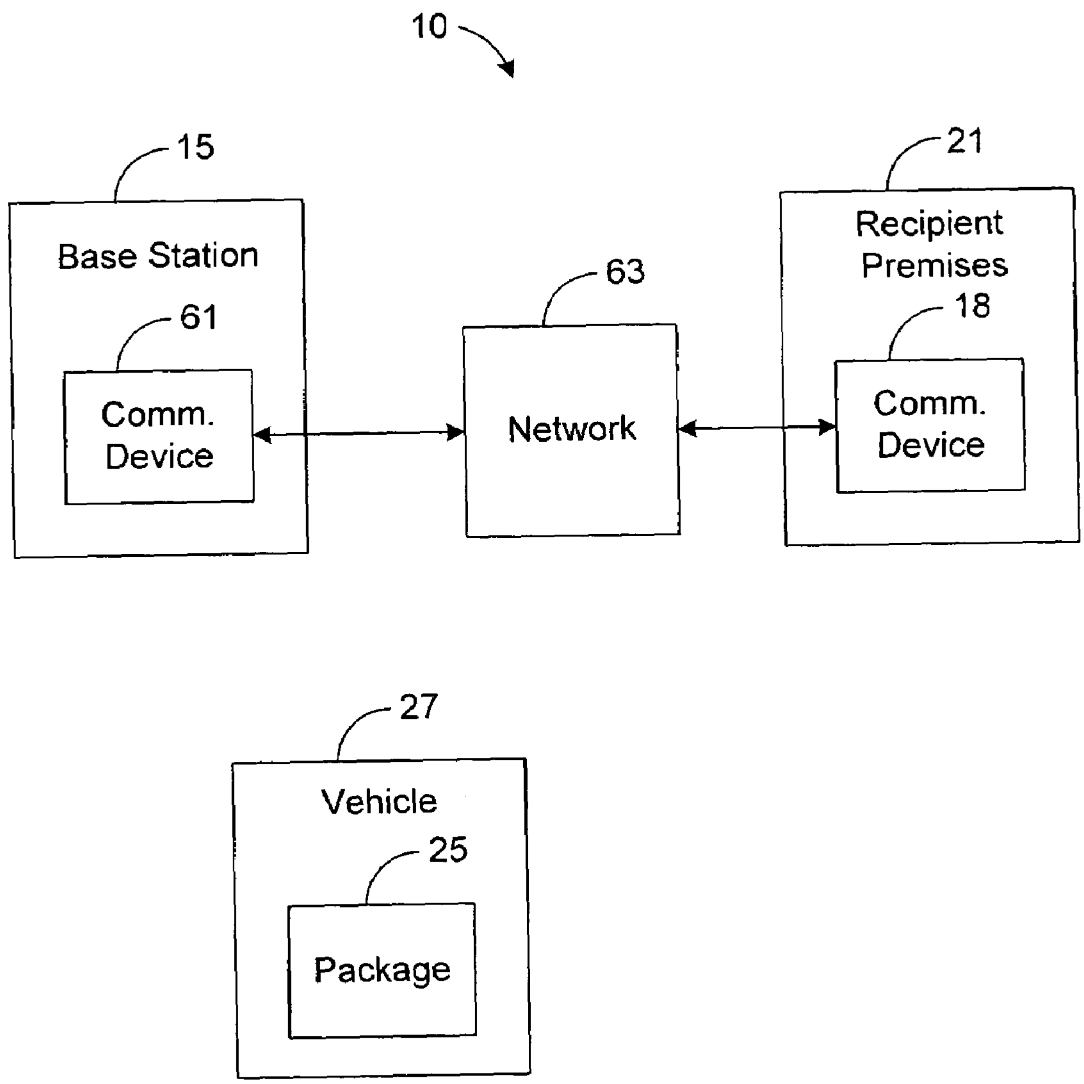
FIG. 1 is a block diagram illustrating a package delivery notification system in accordance with the present invention.

FIG. 1 depicts a package delivery notification system 10 in accordance with the preferred embodiment of the present invention. In general, the present invention includes a base station 15 that transmits a notification message to a recipient communications device 18 at a recipient's premises 21 the day that a recipient at premises 21 is to receive a package 25. The message is preferably transmitted after the package 25 is assigned to a particular delivery vehicle 27, which delivers the package 25 to premises 21, and the message preferably includes a precise time period in which the package 25 is expected to be delivered at premises 21.

The operation of the base station 15 is preferably controlled by a system manager, which can be implemented in software, hardware, or a combination thereof. In the preferred embodiment, as illustrated by way of example in FIG. 2, the system manager 30 of the present invention along with its associated methodology is implemented in software and stored in computer memory 32 of a computer system 34 along with a vehicle schedule 37, which will be described in more detail hereinafter.

Note that the system manager 30, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the system manager 30 may be magnetically stored and transported on a conventional portable computer diskette.

Figure 2:
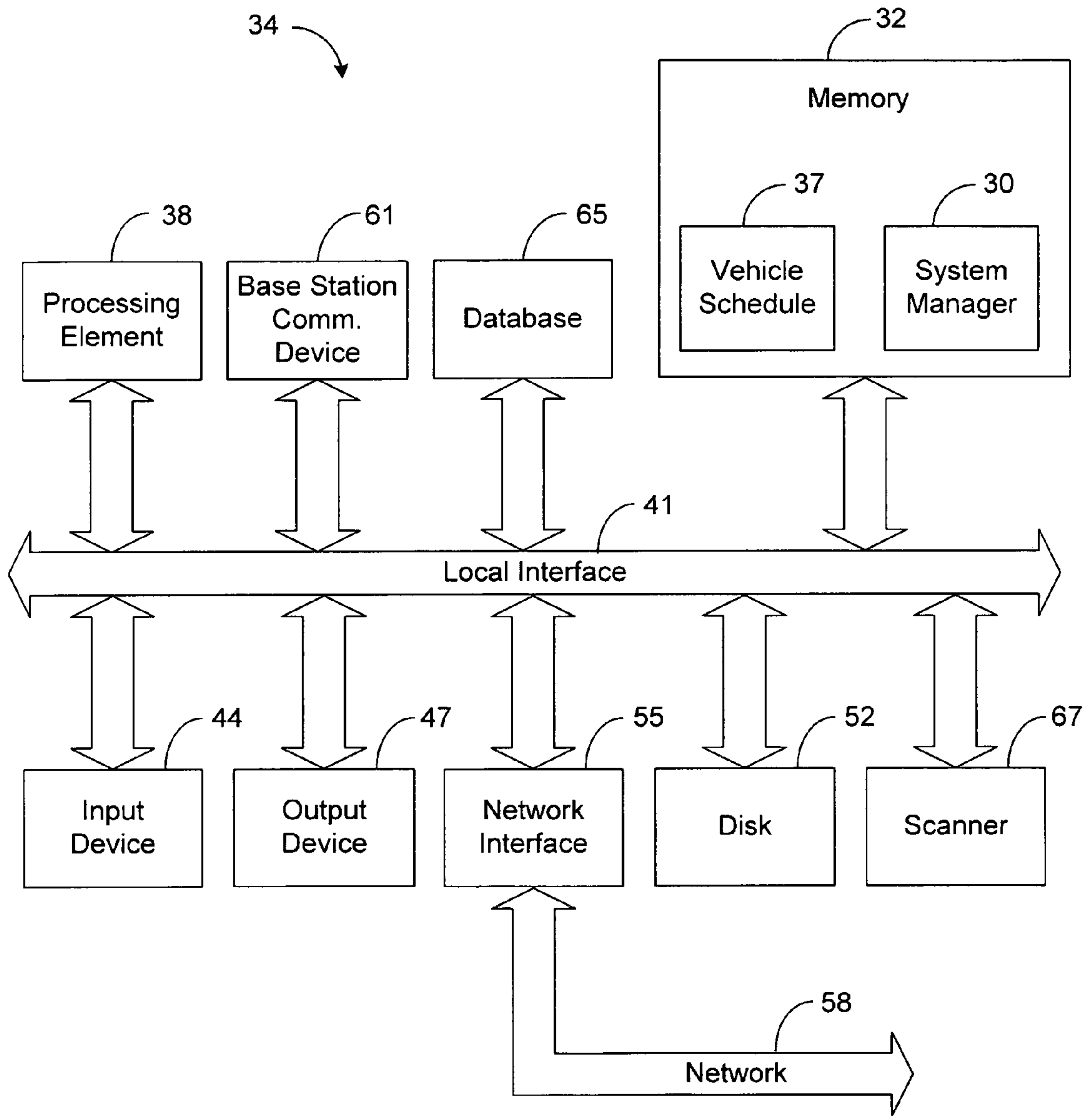
FIG. 2 is a block diagram illustrating a computer system implementing a base station depicted in FIG. 1.

The preferred embodiment of the computer system 34 of FIG. 2 comprises one or more conventional processing elements 38, such as a digital signal processor (DSP), that communicate to and drive the other elements within the system 34 via a local interface 41, which can include one or more buses. Furthermore, an input device 44, for example, a keyboard or a mouse, can be used to input data from a user of the system 34, and an output device 47, such as a display screen or a printer, can be used to output data to the user. A disk storage mechanism 52 can be connected to the local interface 41 to transfer data to and from a nonvolatile disk (e.g., magnetic, optical, etc.). The system 34 can be connected to a network interface 55 that allows the system 34 to exchange data with a network 58.

The system 34 also includes a base station communications device 61 that may be used to transmit notification messages to the recipient communications device 18 (FIG. 1). As shown by FIG. 1, the notification messages may be transmitted via a network 63, such as the publicly switched telephone network (PSTN) or Internet, for example, to recipient communications device 18. Base station communications device 61 may be a telephone so that the notification message may be transmitted via a telephone call or a page. Alternatively, the communications device 61 may be a modem capable of transmitting the notification message as an e-mail message or other type of modem transmitted message. Other types of devices in other embodiments may be suitable for implementing the base station communications device 61. The recipient communications device 18, similar to the base station communications device 61, may be implemented via different types of devices, depending on the type of communication used to communicate the notification message.

The system 34 (FIG. 2) also includes a database 65. The database 65 may have a plurality of entries, wherein each entry includes data associated with a particular package 25 that is to be delivered to a particular premises 21. Each entry preferably includes sufficient data to identify the package 25 associated with the entry, as well as the premises 21 that the package 25 is to be delivered. As an example, the entry associated with a particular package 25 may include a package identifier, which has a value unique to the package 25. The entry may also include data to identify the premises 21 at which the package 25 is to be delivered. For example, the entry may include data defining the address of the premises 21. The entry may also include other data pertinent to the delivery of the package 25. As an example, the entry may include data defining the sender's name and/or address, data defining billing information, data defining the recipient's name, data defining the weight of the package 25, etc.

At some point, the package 25 should be assigned to a particular vehicle 27, which is to deliver the package 25 to the premises 21. Other packages 25 may also be assigned to the same vehicle 27 to deliver the other packages 25 at other premises 21. A vehicle schedule 37 (FIG. 2), defining which packages 25 have been assigned to the vehicle 27 for delivery during the same delivery period (e.g., during the same day), is preferably created and stored in memory 32, although the vehicle schedule 37 may be stored in another location, such as database 65, for example.

The vehicle schedule 37 preferably indicates at least which packages 25 are assigned to the vehicle 27 shown by FIG. 1 and indicates the premises 21 at which each of the packages 25 is to be delivered. As a result, the vehicle schedule 37 can be analyzed to determine which packages 25 are to be delivered by a particular vehicle 27 and where each of these packages 25 is to be delivered. When the system 10 is associated with a plurality of vehicles 27, there may be a plurality of vehicle schedules 37 respectively corresponding with the plurality of vehicles 27. Therefore, each vehicle 27 corresponds to a vehicle schedule 37 that indicates which packages 25 have been assigned to the vehicle 27 for delivery.

The vehicle schedule 37 may also indicate the order in which the vehicle 27 is scheduled to deliver each of the packages 25 or set of packages 25. Furthermore, vehicle schedule 37 may also define the approximate respective time that the vehicle 27 is expected to deliver each of the packages 25. Since the order of delivery is known, it is possible to predict the time period in which each package 25 is to be respectively delivered with a relatively high degree of precision and accuracy.

The vehicle schedule 37 also includes contact information that may be used to establish communication with the recipient communications devices 18. As an example, when the communications device 18 is a telephone or a pager, the contact information preferably defines a phone number that may be used to establish a telephone call with the device 18. In another example, when the communications device 18 is a computer modem designed to communicate e-mail messages, the contact information defines the e-mail address of the device 18. Therefore, the vehicle schedule 37 not only includes information defining when the vehicle 27 is expected to deliver each package 25 but also includes contact information that enables the base station communications device 61 to establish communication with the recipient communications device 18.

There are various methodologies that may be employed to create or to otherwise define the data in the vehicle schedule 37. For example, a human operator may assign a plurality of packages 25 to a particular vehicle 27 and estimate the time at which each of the packages 25 will be delivered based on the order of delivery, as determined by the human operator. Then, the human operator may enter the aforementioned data into the system 34 via input device 44 to create the vehicle schedule 37.

In another embodiment, the foregoing functionality may be performed by the system manager 30 stored in memory 32. In this regard, the system manager 30 may be configured to analyze the data stored in database 65 and to automatically assign a plurality of packages 25 to the vehicle 27 based on the data stored in database 65 (e.g., based on the locations of the scheduled deliveries). Then, the system manager 30 may be designed to determine an order of delivery based on the locations of the premises 21 that are to receive the packages 25 presently assigned to the vehicle 27, and the system manager 30 may also estimate the time that each package 25 will be delivered based on a variety of factors, such as the order of delivery, the distance between delivery locations, the amount of time required to make past deliveries to the same or nearby locations, etc. Moreover, any technique or combinations of techniques may be employed to create vehicle schedule 37 without departing from the principles of the present invention. U.S. patent application entitled "Base Station Apparatus and Method for Monitoring Travel of a Mobile Vehicle," assigned Ser. No. 09/395,501, and filed on Sep. 14, 1999, which is incorporated herein by reference, describes in more detail techniques for creating a vehicle schedule 37.

In addition, a scanner 67 may be utilized in determining which packages 25 are assigned to which vehicles 27. In this regard, packages 25 may be scanned as they are being loaded onto a particular vehicle 27 to determine which packages 27 are assigned to the vehicle 27. For example, each package 25 may include a label having a bar code or other machine-readable markings that identify the package 27. To load a vehicle 27 with packages 25, the packages 25 assigned to the vehicle 27 on a particular day are usually grouped together and loaded onto the vehicle 27 during a loading period. The labels of the packages 25 grouped together for loading may be scanned by a scanner 67 that identifies the packages based on the information scanned from the labels. Alternatively, the label of each package 25 being loaded onto the vehicle 27 may be scanned by the scanner 67 to identify the packages 25 loaded onto the vehicle 27, or the labels of the packages 25 may be scanned after the packages 27 have been loaded onto the vehicle 27. Each of the foregoing package 25 scanned by the scanner 67 is assumed to be assigned to the vehicle 27. Information identifying the vehicle 27 and each package 25 assigned to the vehicle 27 is transmitted from the scanner 67 to the system manager 30, when the scanner 67 is interfaced with the computer system 34, as shown by FIG. 2. The system manager 30 then stores this information in the vehicle schedule 37, as appropriate, to indicate which packages 25 have been assigned to vehicle 27 for delivery.

The system manager 30 is configured to analyze the vehicle schedule 37 and to transmit a notification message to the recipient communications device 18 indicating when the vehicle 27 is expected to deliver a package 25 to the recipient's premises 21, as determined from the vehicle schedule 37. Therefore, the notification message informs the recipient at premises 21 that he or she is to receive a package 25 and informs the recipient of when he or she is expected to receive the package 25. The time provided to the recipient is more precise and accurate than times conventionally provided to recipients, since the time indicated in the vehicle schedule 37 takes into account the order of deliveries that the vehicle 27 is scheduled to make on the day of the package delivery.

As previously indicated, it is possible for the system 10 to report the delivery for a plurality of vehicles 27. In this regard, a vehicle schedule 37 for each vehicle 27 is created and stored in memory 32. The system manager 30 then analyzes each vehicle schedule 37, according to the techniques described herein, and transmits a notification message to each recipient that is scheduled to receive a package 25 during a particular time period (e.g., on the same day).

It should be noted that it is not necessary for the system manager 30 to base the notification messages on the order that the vehicle 27 is scheduled to deliver packages 25. For example, in another embodiment, the system manager 30 can be configured to analyze the data in database 65 to determine which packages 25 are scheduled to be delivered during a particular time period (e.g., on the same day) and to transmit notification messages for these packages 25. However, since the system manager 30 does not utilize the order of deliveries, as in the preferred embodiment, the time of delivery indicated by the notification messages is less precise. Consequently, each recipient is automatically warned of each impending delivery that is to occur during the particular time period but is not necessarily provided with a relatively precise indication of when each delivery will occur during the particular time period.

It should be further noted that the present invention has been described herein as providing notification messages to notify users of impending arrivals of packages 25. However, it is possible for the present invention to be utilized, as described herein, to notify users of impending pick-ups by vehicles, if desired. For example, the present invention may be utilized to notify a user when a vehicle 27 is scheduled to pick-up an item at a particular location.

Furthermore, it should also be noted that system manager 30 may be configured to automatically transmit a notification message to communications device 18 in response to an event that indicates when a package 25 is assigned to a vehicle 27. For example, when the label of a package 25 is scanned by scanner 67, as described hereinbefore, and when data indicating that a package 25 is assigned to a particular vehicle 27 is transmitted to the system manger 30 via scanner 67, the system manager 30 may be configured transmit a notification message in response to the foregoing data. In this regard, the system manager 30 may retrieve contact information associated with the package 25 from database 65 and utilizes the retrieved contact information to transmit a notification message to the communications device 18. Alternatively, the system manager 30 may transmit the notification message in response to other events that may indicate that the package 25 has been assigned to a vehicle. For example, when an operator enters data into the system 34 via input device 44 indicating that a package 25 has been assigned to a particular vehicle 27, the system manager 30, in response to this data, may transmit a notification message to the communications device 18 associated with the recipient that is to receive the package 25.

Once a package 25 is assigned to a particular vehicle 27 for delivery on a particular date and/or at a particular time, it is likely that the package 25 will be delivered at the particular time (e.g., on a particular date). Therefore, in many delivery systems 10, the estimated time of delivery for a package 25 that has already been assigned to a vehicle 27 is more likely to be correct than an estimated date and/or time of delivery for a package that has yet to be assigned to a vehicle 27. By transmitting the notification message after detecting that the corresponding package 25 has been assigned to a vehicle 27, the accuracy of the notification messages may be improved.

In addition, once the vehicle 27 begins traveling its delivery route, the system manager 30 can be configured to track the vehicle 27 and to transmit another notification message to the recipient's communications device 18, when the vehicle 27 is within a predefined proximity (e.g., distance or time) of the premises 21. U.S. patent application entitled "Advance Notification System and Method Utilizing a Computer Network," assigned Ser. No. 08/852,119, and filed on May 6, 1997, and U.S. Pat. No. 5,400,020, which are both incorporated herein by reference, describes in more detail how the vehicle 27 may be so tracked by the system manager 30 based on signals transmitted from the vehicle 27 and how such a notification message may be transmitted.

It should be further noted that the contact information may be provided from any source. For example, the sender may provide the contact information, which is then entered into the system 34. Alternatively, the contact information may be provided by the recipient. For example, a web page may be established by the operator of the system 34 that enables users, including recipients, to provide the contact information needed to establish communication with communications device 18. Therefore, if the recipient would like to receive notice of when a package 25 should be delivered to the recipient, the recipient may utilize the web page via conventional techniques to submit the necessary contact information, which is then provided to system 34 via network interface 55. Furthermore, the contact information may be retained for future deliveries. For example, the contact information may be permanently stored in database 65 along with the recipient's address or other information that uniquely identifies the recipient. Whenever a package 25 is destined for the user, the system manager 30 can then analyze the database 65 to determine the contact information for the recipient.

OPERATION

Figure 3:
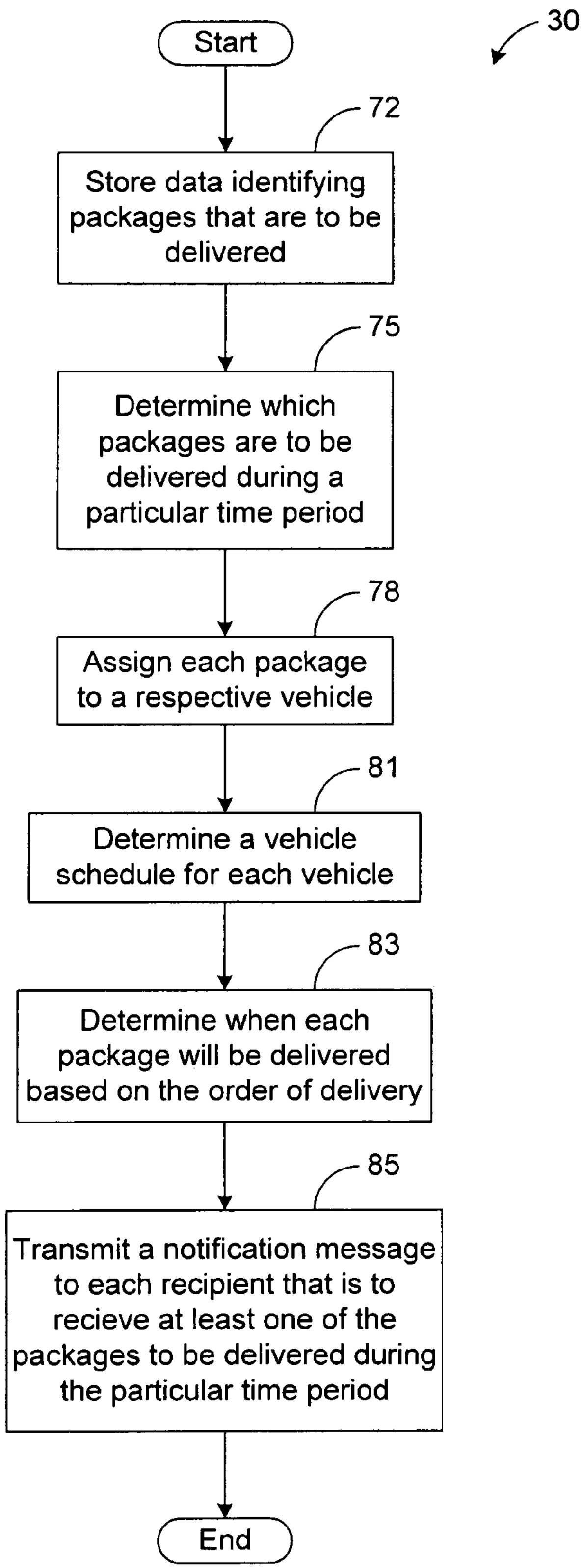
FIG. 3 is a flow chart illustrating the architecture and functionality of a system manager depicted in FIG. 2.

The preferred use and operation of the package delivery notification system 10 and associated methodology are described hereafter with reference to FIG. 3.

Assume for illustrative purposes that a sender utilizes a delivery service to send at least one package 25 to a recipient at the recipient premises 21 shown by FIG. 1. The sender may provide an operator of the delivery service with the address of the premises 21 and preferably the contact information necessary to establish communication with the recipient communications device 18. However, as previously indicated, the contact information may be provided by the recipient or other source. As shown by block 72 of FIG. 3, the delivery service via a human operator or system manager 30 assigns a package identifier to the package 25 and stores the package identifier and the information provided by the sender into an entry in the database 65.

At some point, the package 25 is assigned to a particular vehicle 27 that is to deliver the package 25 to the premises 21 on a particular day, as depicted by blocks 75 and 78. The vehicle 27 may be assigned other packages 25 to deliver to other premises 21. Based on the packages 25 to be delivered by the vehicle 27 on the particular day (or some other time period), the vehicle schedule 37 is produced in block 81. The vehicle schedule 37 includes data that defines which packages 25 are to be delivered by the vehicle 27 on the particular day (or some other time period), when these packages 25 are expected to be delivered, and the contact information necessary to establish communication with the recipient communications devices 18 associated with the recipients that are to receive a package 25 from the vehicle 27 on the particular day (or other time period).

As an example, assume that the package 25 provided by the aforementioned sender is scheduled to be the third package 25 to be delivered by the vehicle 27. Based upon the package's order of delivery, the approximate time of delivery of the package 25 is determined and stored in memory 32, as shown by block 83. For example, it may be assumed that each delivery will take fifteen minutes on the average. Therefore, the delivery of the foregoing package 25 is expected to occur approximately forty-five minutes after the vehicle 27 begins its delivery route. Assuming that the vehicle 27 is scheduled to begin its delivery route at approximately 9:00 a.m., the time in vehicle schedule 37 indicating the time of delivery of the foregoing package 25 should be defined as 9:45 a.m. Alternatively, a margin of error of ten minutes, for example, could be factored in such that the time of delivery of the foregoing package 25 could be defined in vehicle schedule 37 as between approximately 9:35 a.m. and approximately 9:55 a.m.

In other embodiments, other factors could be accounted for. For example, instead of using an average time for each delivery, the time of each delivery could be estimated based on the order of delivery and the distances between successive deliveries. Furthermore, expected traffic conditions (e.g., congested or non-congested) or other factors could be considered to make the estimates more accurate. In any event, the time of delivery indicated by the vehicle schedule 37 is based on the expected order of deliveries that the vehicle 27 is expected to make in delivering the assigned packages 25.

Once the vehicle schedule 37 is defined, the system manager 30 transmits a notification message in block 85 of FIG. 3 to each recipient that is expected to receive a delivery from the vehicle 27. Therefore, the communications device 18 at the premises 21 receives a notification message and interfaces the notification message with the recipient. By analyzing the notification message, the recipient is aware that a package 25 is being delivered to the recipient and is aware of the approximate time that the package 25 should arrive at the premises 21.

In the preferred embodiment, the notification messages for the packages 25 to be delivered by the vehicle 27 on the same day are transmitted to the recipients on the day that the vehicle 27 is to make the deliveries. However, the notification messages may be transmitted at other times, if desired. Furthermore, the vehicle schedule 37 has been described hereinabove as defining the deliveries that are to be made by the vehicle 27 on a particular day. However, the vehicle schedule 37 may be used to define the deliveries that are to be made by the vehicle 27 for other time periods, if desired.

It should be noted that, in the preferred embodiment, the system manager 30 performs each of the steps depicted by FIG. 3. However, it is not necessary for the system manager 30 to perform each of these steps, and it is possible for some of the steps to be performed by other devices and/or by a human operator. For example, it is possible for a human operator and/or another device to perform blocks 72, 75, 78, and 81 while the system manager 30 performs blocks 83 and 85. In other embodiments, other combinations are possible.

In addition it is possible to omit block 83. For example, a notification message could be transmitted to the communications device 18 of each recipient that is to receive at least one of the packages 25 that is assigned to a particular vehicle 27 in block 78. Therefore, once a package 25 is assigned to a particular vehicle 27, a notification message identifying approximately when the package 25 should arrive at the recipient's premises 21 is transmitted to the recipient. It is not necessary for the time indicated by the notification message to be based on the order of deliveries that the vehicle 27 is expected to make.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. A system for reporting impending vehicle deliveries, comprising:

memory storing a vehicle schedule, said vehicle schedule identifying packages that are to be respectively delivered to a plurality of recipients by a vehicle during a first time period and indicating an order that said vehicle is expected to deliver said packages;

a first communications device configured to establish communication with remote communications devices; and a system manager configured to analyze said vehicle schedule and to determine, based on said order, a second time period that said vehicle is expected to deliver one of said packages, said system manager further configured to transmit a notification message for a respective one of said recipients of said one of said packages via said first communications device, said notification message identifying said second time period, wherein said second time period is within said first time period.

2. The system of claim 1, wherein said notification message is an e-mail message.

3. The system of claim 1, wherein said first time period is a day.

4. The system of claim 1, wherein said vehicle schedule identifies each recipient that is to receive at least one of said packages, said notification message identifying each of said packages to be received by one of said recipients during said first time period.

5. The system of claim 4, wherein said notification message is transmitted to a recipient remote communications device of said one of said recipients.

6. A method for reporting impending vehicle deliveries, comprising the steps of:

receiving a plurality of packages;

assigning each of said packages to a vehicle;

determining an order that said vehicle is to deliver said packages;

determining, based on said order, a first time period that said vehicle is expected to deliver one of said packages to a recipient;

causing a notification message to be transmitted to said recipient based on said determining a first time period step;

indicating said first time period via said notification message;

simultaneously transporting each of said packages via said vehicle; and transporting said one package to a premises of said recipient via said vehicle.

7. The method of claim 6, further comprising the step of transmitting said notification message via an e-mail message.

8. The method of claim 6, further comprising the steps of:

determining whether each of said packages is expected to be delivered during a second time period; and performing said assigning step based on said determining whether step, wherein said first time period is within said second time period.

9. The method of claim 8, wherein said second time period is a day.

10. A system for reporting impending vehicle deliveries, comprising:

means for receiving a plurality of packages;

means for assigning each of said packages to a vehicle;

means for determining an order that said vehicle is to deliver said packages;

means for determining, based on said order, a first time period that said vehicle is expected to deliver one of said packages to a recipient;

means for causing a notification message to be transmitted to said recipient, said notification message indicating said first time period;

means for simultaneously transporting each of said packages via said vehicle; and means for transporting said one package to a premises of said recipient via said vehicle.

11. The system of claim 10, wherein said notification message is transmitted via an e-mail message.

12. The system of claim 10, further comprising:

means for determining whether each of said packages is expected to be delivered during a second time period; wherein:

said packages are assigned to said vehicle based on an expectation of delivery during said second time period; and said first time period is within said second time period.

13. The system of claim 10, wherein said second time period is a day.

* * * * *